US012643518B2

(12) United States Patent
Li et al.

(10) Patent No.: US 12,643,518 B2
(45) Date of Patent: Jun. 2, 2026

(54) BRAKING METHOD, VEHICLE AND MEDIUM

(71) Applicant: Beijing Tusen Zhitu Technology Co., Ltd., Beijing (CN)

(72) Inventors: Xianbin Li, Beijing (CN); Letian Wang, Beijing (CN)

(73) Assignee: Beijing Tusen Zhitu Technology Co., Ltd., Beijing (CN)

( * ) Notice: Subject to any disclaimer, the term of this patent is extended or adjusted under 35 U.S.C. 154(b) by 351 days.

(21) Appl. No.: 18/118,947

(22) Filed: Mar. 8, 2023

(65) Prior Publication Data

US 2023/0286481 A1     Sep. 14, 2023

(30) Foreign Application Priority Data

Mar. 9, 2022     (CN) .......................... 202210226543.X

(51) Int. Cl.
      *B60T 13/66*          (2006.01)
      *B60T 7/12*           (2006.01)
                            (Continued)

(52) U.S. Cl.
      CPC .......... *B60T 13/662* (2013.01); *B60T 13/268* (2013.01); *B60T 13/45* (2013.01); *B60T 13/581* (2013.01);
                            (Continued)

(58) Field of Classification Search
      CPC ...... B60T 13/662; B60T 13/268; B60T 13/45; B60T 13/581; B60T 7/12; B60T 2201/03;
                            (Continued)

(56) References Cited

U.S. PATENT DOCUMENTS

| | | | | |
|---|---|---|---|---|
| 4,749,238 A | * | 6/1988 | Singleton | .............. B60T 13/662 |
| | | | | 303/7 |
| 4,804,234 A | * | 2/1989 | Gee | .................... B62D 53/0807 |
| | | | | 303/9.62 |

(Continued)

FOREIGN PATENT DOCUMENTS

| | | |
|---|---|---|
| CN | 106090075 A | 11/2016 |
| CN | 106627530 | 5/2017 |

(Continued)

OTHER PUBLICATIONS

Office Action in United Arab Emirates Appln. No. P6000532/2023, mailed on Nov. 22, 2024, 12 pages.

(Continued)

*Primary Examiner* — Kurt Philip Liethen
(74) *Attorney, Agent, or Firm* — Fish & Richardson P.C.

(57)          ABSTRACT

The present application discloses a braking method, a vehicle and a medium, wherein the vehicle comprises a primary braking system, a parking brake, an auxiliary high-pressure gas tank, and a retarder, and the braking method comprises: determining whether a current air pressure value of the auxiliary high-pressure gas tank reaches a preset air pressure value; controlling, in response to the current air pressure value not reaching the preset air pressure value, the auxiliary high-pressure gas tank to carry out air pressure loading; and controlling, in response to failure of the primary braking system and the current air pressure value reaching the preset air pressure value, a first braking torque of the parking brake and a second braking torque of the retarder according to a deceleration signal of the vehicle so as to control the vehicle to brake.

19 Claims, 4 Drawing Sheets

(51) Int. Cl.
  *B60T 13/26*          (2006.01)
  *B60T 13/45*          (2006.01)
  *B60T 13/58*          (2006.01)

(52) U.S. Cl.
  CPC ............. *B60T 7/12* (2013.01); *B60T 2201/03*
        (2013.01); *B60T 2250/04* (2013.01); *B60T*
        *2270/413* (2013.01); *B60T 2270/88* (2013.01)

(58) Field of Classification Search
  CPC .......... B60T 2250/04; B60T 2270/413; B60T
        2270/88; B60T 1/08; B60T 17/02; B60T
        13/585
  See application file for complete search history.

(56)                References Cited

U.S. PATENT DOCUMENTS

| | | | |
|---|---|---|---|
| 5,303,986 | A | 4/1994 | VanDeMotter et al. |
| 7,672,771 | B2 * | 3/2010 | Nakanishi ............... B60T 10/02 |
| | | | 477/118 |
| 9,988,024 | B2 * | 6/2018 | Schwartz ............. G07C 5/0808 |
| 10,086,811 | B2 * | 10/2018 | Yao .......................... B60T 8/175 |
| 10,384,546 | B2 * | 8/2019 | Wolff ........................ B60L 7/26 |
| 2004/0163794 | A1 * | 8/2004 | Takagi .................... F02B 43/00 |
| | | | 62/323.1 |
| 2013/0033097 | A1 * | 2/2013 | Biller ...................... B60T 7/042 |
| | | | 303/6.01 |
| 2020/0400137 | A1 | 12/2020 | Jo et al. |
| 2022/0144232 | A1 * | 5/2022 | Van Thiel ............. B60T 13/662 |

FOREIGN PATENT DOCUMENTS

| | | | | |
|---|---|---|---|---|
| CN | 107054332 | A | 8/2017 | |
| CN | 105459987 | | 5/2018 | |
| CN | 108248582 | A | 7/2018 | |
| CN | 108495773 | | 9/2018 | |
| CN | 109398334 | A | 3/2019 | |
| CN | 107709108 | | 2/2020 | |
| CN | 210133103 | | 3/2020 | |
| CN | 111055828 | | 4/2020 | |
| CN | 212423081 | U | 1/2021 | |
| CN | 110641432 | | 3/2021 | |
| CN | 110605967 | | 4/2021 | |
| CN | 113246942 | A | 8/2021 | |
| EP | 3225483 | | 10/2017 | |
| EP | 3835148 | | 6/2021 | |
| WO | WO 93/18949 | | 9/1993 | |
| WO | WO-2020244793 | A1 * | 12/2020 | ........... B60T 13/268 |

OTHER PUBLICATIONS

Extended European Search Report in European Appln. No. 23159388.0, dated Aug. 1, 2023, 8 pages.
Office Action in Chinese Appln. No. 202210226543.X, mailed on Nov. 25, 2025, 18 pages (with English Translation).

\* cited by examiner

BRAKING METHOD, VEHICLE AND MEDIUM

CROSS REFERENCE TO RELATED APPLICATIONS

The present disclosure claims priority to Chinese Patent Application No. 202210226543.X, entitled "BRAKING METHOD, VEHICLE, DATA PROCESSING SYSTEM AND MEDIUM," filed on Mar. 9, 2022, the content of which is incorporated herein by reference in its entirety.

TECHNICAL FIELD

The embodiments of the present disclosure relate to the field of vehicle control, and in particular to a braking method, a vehicle and a medium.

BACKGROUND

The high-level autonomous driving system reduces the dependence on human drivers and can actively and effectively react to the emergency safety conditions of the vehicle itself and the outside. Based on the X-by-wire system, autonomous vehicles form a complete control link such that the vehicle's controller can control the throttle, steering, braking, etc. via the vehicle data bus. Compared with a traditional mechanical control or manned X-by-wire system, functional safety requires a designer to perform redundant design on the X-by-wire system according to the characteristics of an autonomous vehicle, such that the vehicle can still rely on the redundant braking system to ensure safe driving or safe parking if the primary braking system fails. Therefore, how to provide a redundant design for a braking system of a vehicle to improve the reliability and safety of the braking system is an urgent problem to be solved.

SUMMARY

In view of this, the present disclosure provides a braking method, a vehicle, a data processing system and a medium, which shorten the response time of the retarder and effectively reduce instability caused by sudden braking.

According to an aspect of the present disclosure, provided is a braking method, wherein a vehicle includes a primary braking system, a parking brake, an auxiliary high-pressure gas tank, and a retarder, and the braking method includes:

determining whether a current air pressure value of the auxiliary high-pressure gas tank reaches a preset air pressure value or not;

in response to the fact that the current air pressure value does not reach the preset air pressure value, controlling the auxiliary high-pressure gas tank to carry out air pressure loading; and in response to the failure of the primary braking system and the fact that the current air pressure value reaches the preset air pressure value, respectively controlling a braking torque of the parking brake and a braking torque of the retarder according to a deceleration signal of the vehicle so as to control the vehicle to brake.

According to another aspect of the present disclosure, provided is a vehicle including: a primary braking system, a redundant controller, a parking brake, a retarder and an auxiliary high-pressure gas tank, wherein the redundant controller is respectively connected with the primary braking system, the parking brake, the retarder and the auxiliary high-pressure gas tank, and the auxiliary high-pressure gas tank is connected with the parking brake.

According to another aspect of the present disclosure, provided is a data processing system comprising a processor and a memory, wherein the memory is configured for storing one or more programs; the one or more programs, when executed by the processor, cause the processor to implement the braking method according to any of the above embodiments.

According to another aspect of the present disclosure, provided is a computer-readable storage medium having a computer program stored thereon, wherein the program, when executed by a processor, causes the processor to implement the braking method according to any of the above embodiments.

According to the embodiments of the present disclosure, the auxiliary high-pressure gas tank is subjected to air pressure loading when the current air pressure value of the auxiliary high-pressure gas tank does not reach the preset air pressure value, so that the response time of the retarder is shortened; and when the primary braking system fails and the current air pressure value reaches the preset air pressure value, the combined type deceleration is performed through the retarder and the parking brake, so that reasonable and gradual braking torque is provided for the vehicle, and instability caused by sudden braking is effectively reduced.

It should be understood that what is described in this section is not intended to identify key or critical features of the embodiments of the present disclosure, and it is also not intended to limit the scope of the present disclosure. Other features of the present disclosure will become apparent from the following description.

BRIEF DESCRIPTION OF THE DRAWINGS

In order to more clearly illustrate the technical solutions in the embodiments of the present disclosure, the drawings required for use in the embodiments will be briefly described below. It is obvious that the drawings in the description below are only some embodiments of the present disclosure, and other drawings can be derived from these drawings by those skilled in the art without making creative efforts.

DETAILED DESCRIPTION

In order to enable those skilled in the art to better understand the technical solutions of the present disclosure, the technical solutions in the embodiments of the present disclosure will be clearly and completely described below with reference to the drawings in the embodiments of the present disclosure. It is obvious that the described embodiments are only a part rather than all of the embodiments of the present disclosure. All other embodiments obtained by those skilled in the art without making any creative effort based on the embodiments of the present disclosure shall fall within the protection scope of the present disclosure.

It should be noted that the terms "first", "second", etc. in the specification and claims of the present disclosure and the above drawings are used to distinguish similar objects, and do not have to be used to describe a specific order or sequence. It should be understood that the data used in this manner are interchangeable under appropriate circumstances so that the embodiments of the present disclosure described herein can be implemented in other sequences in addition to those illustrated or described herein. Moreover, the terms "comprise" and "have" and any variations thereof are intended to cover non-exclusive inclusion. For example, a process, method, system, product or apparatus comprising a series of steps or units is not necessarily limited to the explicitly listed steps or units, but may comprise other steps or units that are not explicitly listed or are inherent in the process, method, system, product or device.

Embodiment I

Figure 1:
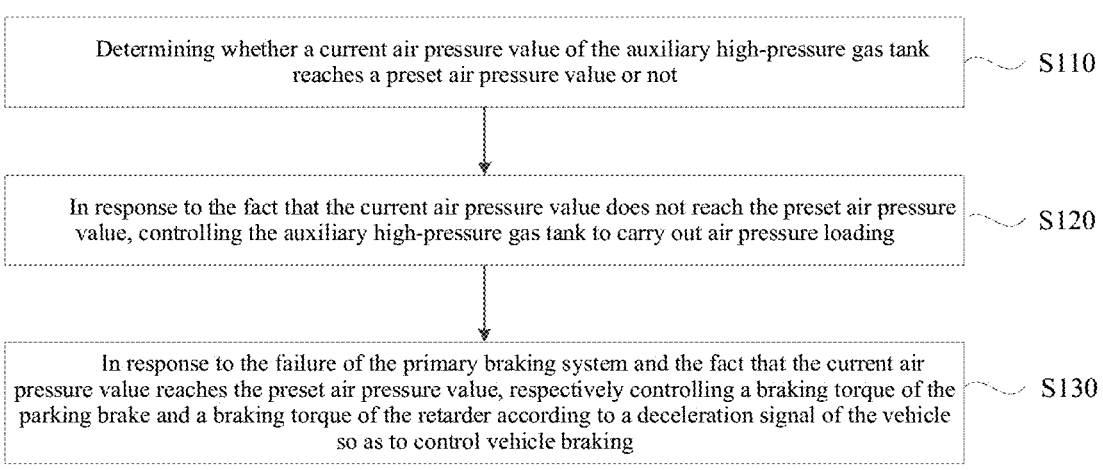
FIG. 1 is a flowchart of a braking method according to an embodiment of the present disclosure.

In an embodiment, FIG. 1 is a flowchart of a braking method according to an embodiment of the present disclosure, and this embodiment may be applicable to a case where a primary braking system of a vehicle fails, wherein the vehicle comprises a primary braking system, a redundant controller, a parking brake, an auxiliary high-pressure gas tank, and a retarder, and the redundant controller is configured for implementing the braking method. As shown in FIG. 1, the braking method in this embodiment may comprise steps S110 to S130.

S110, determining whether a current air pressure value of the auxiliary high-pressure gas tank reaches a preset air pressure value or not.

In the step, the auxiliary high-pressure gas tank can be configured for assisting in the control of the parking brake and the establishment of the working state of the auxiliary hydraulic retarder. The current air pressure value refers to the pressure value of the gas contained in the auxiliary high-pressure gas tank at the current moment; the preset air pressure value refers to a pressure value correspondingly set for enabling the auxiliary high-pressure gas tank to work normally. It can be understood that, in order to enable the auxiliary high-pressure gas tank to be used normally, the current air pressure value of the auxiliary high-pressure gas tank needs to reach the preset air pressure value.

S120, in response to the fact that the current air pressure value does not reach the preset air pressure value, controlling the auxiliary high-pressure gas tank to carry out air pressure loading.

In the step, the process of carrying out air pressure loading on the auxiliary high-pressure gas tank can be understood as a process of air-charging the auxiliary high-pressure gas tank for adjustment. In an embodiment, when the current air pressure value of the auxiliary high-pressure gas tank is smaller than the preset air pressure value, the redundant controller controls the air pump to assist in the air charging of the auxiliary high-pressure gas tank, such that the current air pressure value of the auxiliary high-pressure gas tank can reach the preset air pressure value, and therefore when the primary braking system fails, auxiliary control over the retarder or the parking brake can be timely achieved.

S130, in response to the failure of the primary braking system and the fact that the current air pressure value reaches the preset air pressure value, respectively controlling a braking torque of the parking brake and a braking torque of the retarder according to a deceleration signal of the vehicle so as to control the vehicle to brake.

In the step, the primary braking system comprises: the primary controller and the primary braking actuator. The failure of the primary braking system comprises the failure of the primary controller and the failure of the primary braking actuator, at the moment, the primary braking system cannot complete the expected brake control, and the redundant controller controls the braking torque of the parking brake and the braking torque of the retarder according to the desired deceleration value after determining the desired deceleration value according to the deceleration signal of the vehicle so as to realize the vehicle to brake.

According to the solution in the embodiment, a set of redundant braking system is constructed by the parking brake, the retarder and the auxiliary high-pressure gas tank. When the primary braking system of the vehicle fails, in an aspect, under the assistance of the auxiliary high-pressure gas tank, the hydraulic retarder can quickly establish a working state and provide a braking torque in time so as to intervene in the braking process of the vehicle; in another aspect, the parking brake can be flexibly controlled through cooperative use of the auxiliary high-pressure gas tank and the parking gas tank of the parking brake, so that the rear wheels are prevented from being locked; in yet another aspect, the retarder and the parking brake jointly provide the braking torque, so that excessive abrasion and thermal failure of the parking brake can be prevented.

Embodiment II

In order to explain in detail how the present solution can be applied in practice, the steps of the solution will now be further illustrated by the following embodiments.

Figure 2:
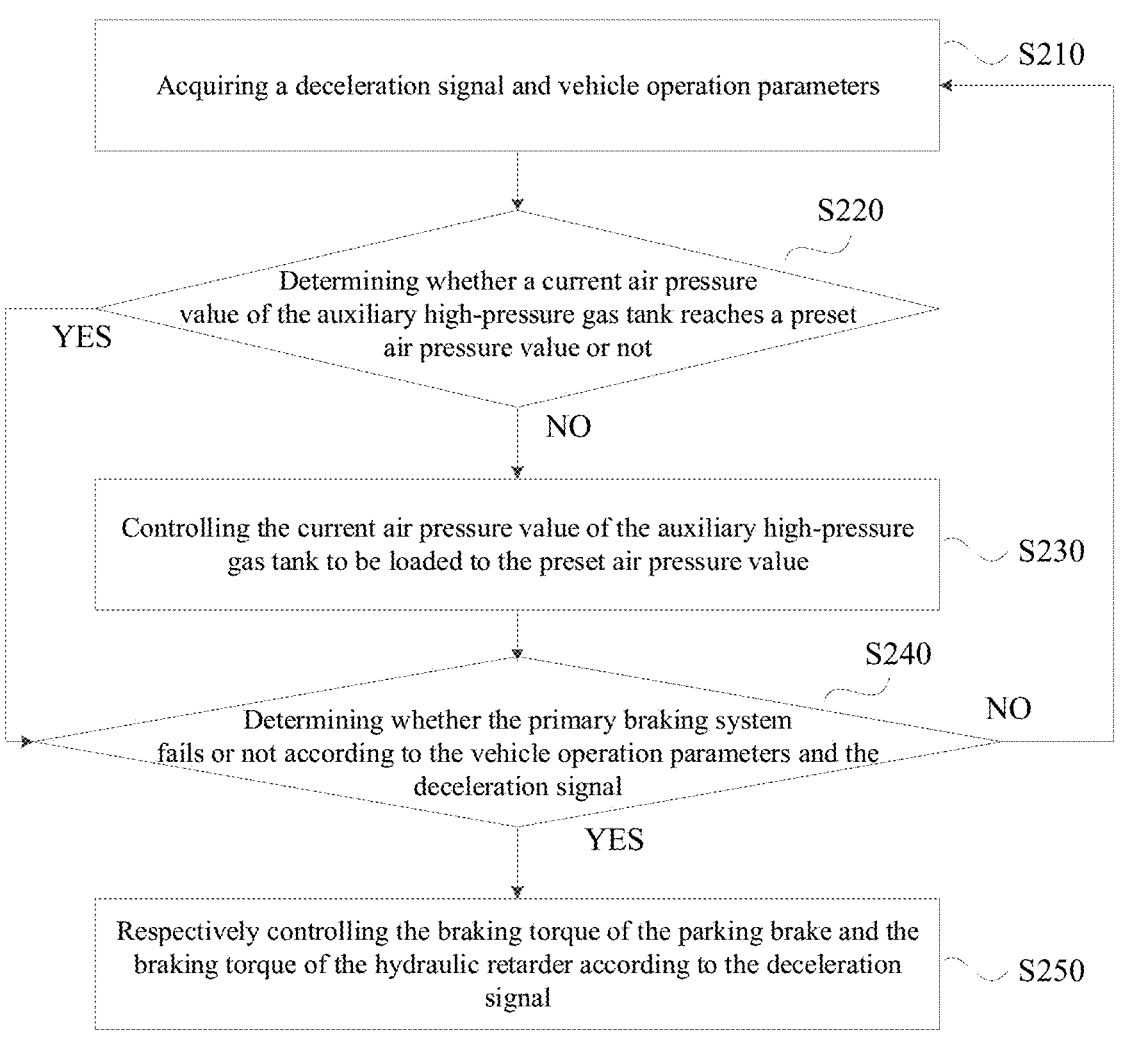
FIG. 2 is a flowchart of a braking method according to another embodiment of the present disclosure.

As shown in FIG. 2, provided is a flowchart of a braking method according to another embodiment of the present disclosure. In this embodiment, a braking process of the vehicle is illustrated by taking the retarder as a hydraulic retarder as an example. The braking method in this embodiment comprises steps S210 to S250.

S210, acquiring a deceleration signal and vehicle operation parameters.

In an embodiment, the redundant controller is in communicative connection with the primary controller to obtain a deceleration signal of the primary controller in real time or periodically. Likewise, the redundant controller may also acquire the deceleration signal of the vehicle from the autonomous driving system in real time or periodically by establishing a communicative connection directly with the autonomous driving system (i.e., the upper computer).

In an embodiment, the redundant controller is in communicative connection with a sensor system of the vehicle, and the redundant controller acquires vehicle operation parameters from the sensor system in real time or periodically, wherein the vehicle operation parameters include the current deceleration value of the vehicle, the current vehicle speed and other related parameter information.

S220, determining whether a current air pressure value of the auxiliary high-pressure gas tank reaches a preset air pressure value or not. If the current air pressure value is determined to not reach the preset air pressure value, the operation proceeds to step S230; if the current air pressure value is determined to reach the preset air pressure value, the operation proceeds to step S240.

In an embodiment, a pressure sensor may be mounted on a main passage where the auxiliary high-pressure gas tank is located, and the redundant controller acquires the current air pressure value of the auxiliary high-pressure gas tank through communicative connection with the pressure sensor.

In an embodiment, the redundant controller obtains a current air pressure value of the auxiliary high-pressure gas tank in response to the deceleration signal, and determines whether the current air pressure value reaches a preset air pressure value or not. Specifically, the deceleration signal indicates that the vehicle is about to enter/has entered a deceleration state, at the moment, the redundant controller acquires a current air pressure value of the auxiliary high-pressure gas tank, and compares and analyzes the current air pressure value and the preset air pressure value to determine whether the current air pressure value reaches the preset air pressure value, such that when the air pressure value of the auxiliary high-pressure gas tank is lower than the preset air pressure value required for the working state, the auxiliary high-pressure gas tank can be controlled to be air-charged in time for adjustment, and therefore when the primary braking system fails, the auxiliary high-pressure gas tank can rapidly enter the working state for assisting the hydraulic retarder to establish the working state and assisting in the control of the parking brake.

In addition, if the performance configuration of the redundant controller is relatively high, the redundant controller can be configured to determine whether the current air pressure value of the auxiliary high-pressure gas tank reaches the preset air pressure value or not in real time according to actual requirements, and the auxiliary high-pressure gas tank is controlled to be pressurized when the current air pressure value does not reach the preset air pressure value, such that the auxiliary high-pressure gas tank can keep a working air-pressure at any time.

In specific application, the auxiliary high-pressure gas tank can be configured for accelerating the process of the working oil of the hydraulic retarder entering the working chamber, so that when the primary braking system fails, the response time of the hydraulic retarder is shortened, and thus the braking torque is provided in time; meanwhile, after the parking brake starts to work, the auxiliary high-pressure gas tank can also be connected with an air passage of the parking brake and configured for applying enough pressure to a control spring of the parking brake to help the parking brake to be quickly separated. In the braking process, the auxiliary high-pressure gas tank can be used together with a gas tank of the parking brake through a switching valve, so that the parking brake can be controlled alternatively, and the wheels are prevented from being locked in the braking process.

Furthermore, the retarder used in the vehicle may also be another type of retarders, such as an eddy current retarder (electromagnetic retarder) or the like. When the retarder is an eddy current retarder, the auxiliary high-pressure gas tank is mainly configured for assisting in the control of the parking brake so as to reduce the possibility of wheel locking in the braking process.

S230, controlling the current air pressure value of the auxiliary high-pressure gas tank to be loaded to the preset air pressure value.

In an embodiment, the redundant controller adjusts the air pressure of the high-pressure gas tank through the air pump. Furthermore, in the process of carrying out air pressure loading on the auxiliary high-pressure gas tank, in order to ensure the unidirectional flow of gas, the redundant controller controls the air pump to assist in the air charging of the auxiliary high-pressure gas tank through the one-way valve; in order to keep the internal pressure of the auxiliary high-pressure gas tank within a safe range, a pressure relief valve can be arranged to perform air discharge adjustment on the auxiliary high-pressure gas tank as needed.

S240, determining whether the primary braking system fails or not according to the vehicle operation parameters and the deceleration signal. If the primary braking system is determined to not fail, the operation returns to step S210; if the primary braking system is determined to fail, the operation proceeds to step S250.

In an embodiment, the redundant controller determines a desired deceleration value of the vehicle according to the deceleration signal of the vehicle, determines a current deceleration value of the vehicle according to the vehicle operation parameters, and determines whether the primary braking system of the vehicle fails or not by comparing whether a difference between the desired deceleration value of the vehicle and the current deceleration value exceeds a preset difference threshold, wherein the desired deceleration value refers to a deceleration value that the vehicle is expected to achieve. It can be understood that the desired deceleration value refers to a theoretical value to which the deceleration is expected to reach; and the current deceleration value refers to an actual deceleration value of the vehicle measured by the sensor. In an embodiment, the current deceleration value and the desired deceleration value may be compared and analyzed, and if the current deceleration value does not reach the desired deceleration value, it indicates that the braking force of the vehicle is insufficient; if the difference between the two is relatively large, the primary braking system may fail. Specifically, a preset difference threshold may be configured, and the difference between the current deceleration value and the desired deceleration value is calculated, and if the difference is greater than the preset difference threshold, the primary braking system of the vehicle is determined to fail. The preset difference threshold may be set according to performance performances or empirical values of different vehicles, or may be adjusted according to actual requirements, which is not limited herein.

It needs to be noted that, in actual operation, the primary braking system may comprise: the primary controller and the primary braking actuator. Accordingly, the failure of the primary braking system may be the failure of the primary brake, the failure of the primary braking actuator, or the failure of a data line in the primary braking system. For example, when the primary controller fails, the primary controller cannot accurately send a control instruction to the primary braking actuator, so that a deceleration signal sent by the upper computer cannot be accurately forwarded to the primary braking actuator by the primary controller, and thus the braking process cannot be effectively controlled; or, when the primary braking actuator fails, although the primary controller can accurately forward the deceleration signal to the primary braking actuator, the primary braking actuator cannot perform the corresponding braking operation according to the deceleration signal; or, when a data link fails, although both the primary controller and the primary braking actuator can work normally, the primary actuator cannot receive the deceleration signal sent by the primary controller. No matter what kind of failure occurs in the primary braking system, the vehicle cannot achieve the desired braking control through the primary braking system, and cannot achieve the desired deceleration value, and at the moment, the intervention of the redundant controller is required.

S250, respectively controlling the braking torque of the parking brake and the braking torque of the hydraulic retarder according to the deceleration signal.

In this embodiment, the redundant controller determines the desired deceleration value of the vehicle according to the received deceleration signal, and obtains the braking torque corresponding to the desired deceleration value through calculation using a dynamic formula, so as to respectively control the parking brake and the hydraulic retarder to correspondingly provide the braking torque, thereby realizing the vehicle braking.

In an embodiment, step S250 may further comprise steps S251 to S253:

S251, controlling the auxiliary high-pressure gas tank to establish a working state of the hydraulic retarder so as to control the braking torque of the hydraulic retarder.

In an embodiment, when the retarder is a hydraulic retarder, the hydraulic retarder presses the working oil for generating a braking torque into the working chamber with the aid of the auxiliary high-pressure gas tank to quickly establish a working state, so that the braking torque can be applied to the transmission shaft to decelerate the vehicle. In addition, when the retarder is an eddy current retarder, the redundant controller controls the eddy current retarder to input current to enter a working state so as to generate the braking torque for the transmission shaft.

At the moment, the retarder can quickly respond, provides the braking torque in time for vehicle braking, and avoids the problem of brake thermal failure possibly caused by directly adopting the parking brake, thereby improving the stability of the system to a certain extent.

S252, controlling the auxiliary high-pressure gas tank and the parking gas tank of the parking brake to alternately adjust the braking torque of the parking brake according to the desired deceleration value.

In an embodiment, under the control of the redundant controller, the auxiliary high-pressure gas tank and the parking gas tank of the parking brake jointly perform braking control on the parking brake, specifically, the electromagnetic switching valve is used for rapidly switching the connection between the parking brake control gas circuit and the auxiliary high-pressure gas tank or the parking gas tank by alternately air-charging and air-discharging the auxiliary high-pressure gas tank and the parking gas tank, so that the braking spring of the parking brake is rapidly controlled, and thus the braking torque of the parking brake is controlled. The control mode can improve the braking flexibility of the parking brake, prevent dangerous scenes possibly caused by wheel locking, and thus improve the stability of the system.

S253, in response to the fact that a sum of the braking torque of the retarder and the braking torque of the parking brake reaches a braking torque corresponding to the desired deceleration value, and the braking torque of the retarder does not reach a maximum braking torque provided by the retarder, controlling to increase the braking torque of the retarder and to reduce the braking torque of the parking brake, and keeping the sum of the braking torque of the retarder and the braking torque of the parking brake unchanged.

In an embodiment, after determining the braking torque corresponding to the desired deceleration value, the redundant controller controls the braking torque of the retarder and the parking brake according to the braking torque corresponding to the desired deceleration value, so that the vehicle can reach the desired deceleration value through the combined braking of the retarder and the parking brake. When a sum of the braking torque of the retarder and the braking torque of the parking brake reaches a braking torque corresponding to the desired deceleration value, if the braking torque of the retarder does not reach the maximum braking torque that can be provided by the retarder at the moment, the braking torque provided by the parking brake can be reduced and the braking torque provided by the retarder can be increased when the sum of the braking torque of the retarder and the braking torque of the parking brake is unchanged.

In the actual operation process, the braking torque provided by the parking brake and the retarder may be the same or different, but the problem of locking or thermal failure easily occurs due to the fact that the parking brake is adopted for vehicle braking; this embodiment relies on the retarder as much as possible to provide the braking torque. Through the above adjustment, the retarder can be fully utilized to provide the braking torque, the possibility of thermal failure caused by overheating of the parking brake is reduced, the service life of the parking brake is prolonged, and thus the stability of the system is improved.

According to the technical solution of this embodiment, the auxiliary high-pressure gas tank is subjected to air pressure loading when the current air pressure value of the auxiliary high-pressure gas tank does not reach the preset air pressure value, so that the response time of the hydraulic retarder is shortened; in addition, when the primary braking system fails, combined braking is carried out through the retarder and the parking brake, so that reasonable and gradual braking torque is provided for the vehicle, and the stability of the vehicle braking system is effectively improved; in addition, through the cooperation of the retarder and the parking brake, the retarder is fully used to provide the braking torque required for the vehicle, the thermal failure problem that the parking brake may produce is also reduced, and thus the driving safety of the vehicle is guaranteed.

Embodiment III

Figure 3:
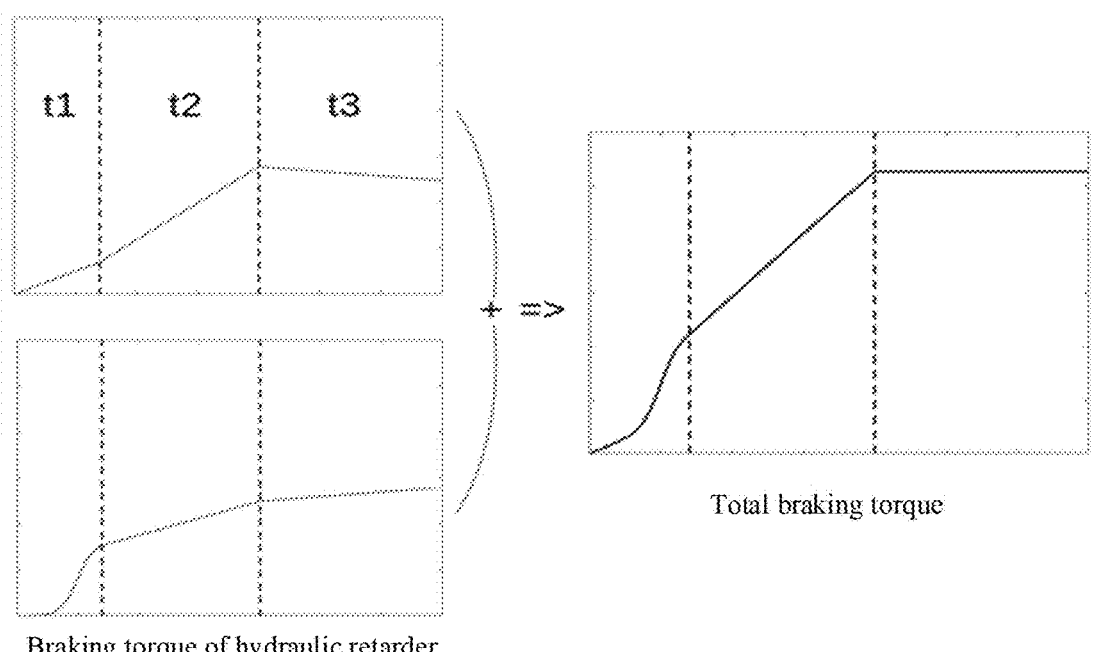
FIG. 3 is a schematic diagram of the configuration of braking torques at various stages according to an embodiment of the present disclosure.

FIG. 3 is a schematic diagram of the configuration of braking torques at various stages according to an embodiment of the present disclosure. The process of the redundant controller intervening in the braking will be further illustrated below by taking the combined deceleration through the parking brake and the hydraulic retarder as an example. The redundant controller can specifically control the vehicle to brake at three stages: a redundant braking intervention stage (recorded as t1), a braking torque establishment stage (recorded as t2) and a braking torque maintaining stage (recorded as t3).

The first stage, namely the redundant braking intervention stage, is as follows:

At this stage, according to the current vehicle speed, the wheel speed of the rear wheels and the desired deceleration value, the redundant controller controls the opening degree of a proportional electromagnetic valve on an original pneumatic control passage of the parking brake to enable the parking brake to gradually apply the braking torque to the wheels; meanwhile, when the retarder loaded on the vehicle is a hydraulic retarder, the hydraulic retarder presses the working oil for generating a braking torque into the working chamber with the aid of the auxiliary high-pressure gas tank to quickly establish a working state, and then the purpose of decelerating the vehicle is achieved by applying the braking torque to the transmission shaft. If the retarder adopted by the vehicle is an eddy current retarder, the redundant controller controls the input current of the eddy current retarder to generate the braking torque for the transmission shaft.

The second stage, namely the braking torque establishment stage, is as follows:

After the above redundant braking intervention stage is completed, the parking brake and the retarder apply the braking torque increasing over time to the rear axle and the transmission shaft, respectively. At the current stage, the redundant controller controls the parking brake through the auxiliary high-pressure gas tank, the switching valve and the parking gas tank, and the electromagnetic switching valve is used for rapidly switching the connection between the parking brake control gas circuit and the auxiliary high-pressure gas tank or the parking gas tank by alternately air-charging and air-discharging the auxiliary high-pressure gas tank and the parking gas tank, so that the control spring of the parking brake is flexibly controlled, and thus the braking torque of the parking brake is controlled. The control mode can prevent dangerous scenes possibly caused by wheel locking and optimize the control effect of the parking brake for braking. Typically, the end of this stage is indicated by the sum of the braking torques generated by the parking brake and the retarder reaching the braking torque corresponding to the desired deceleration value.

The third stage, namely the braking torque maintaining stage, is as follows:

After the braking torques of the retarder and the parking brake are adjusted, if the sum of the braking torques generated by the parking brake and the retarder reaches the braking torque corresponding to the desired deceleration value, and the braking torque provided by the retarder does not reach the maximum braking torque that can be provided by the retarder, the braking torque provided by the parking brake can be reduced when the sum of the braking torque of the retarder and the braking torque of the parking brake is unchanged, and the braking torque provided by the retarder is correspondingly increased, so that the braking torque corresponding to the desired deceleration value is maintained, and meanwhile, the parking brake is prevented from thermal failure.

If the sum of the braking torques generated by the parking brake and the retarder reaches the braking torque corresponding to the desired deceleration value, and the braking torque provided by the retarder reaches the maximum braking torque that can be provided by the retarder, the current braking torque is maintained.

If the braking torque corresponding to the desired deceleration value is larger than the sum of the brake torques that can be provided by the parking brake and the retarder, the redundant controller controls the parking brake and the retarder to respectively provide the maximum brake torque and maintains the maximum braking torque so as to realize the braking.

In the present application, the redundant controller performs combined braking by controlling the parking brake and the retarder, and can quickly respond when the primary braking system fails; meanwhile, the parking brake is alternately controlled through the auxiliary high-pressure gas tank and the parking gas tank, so that the parking brake can be flexibly controlled, and the possibility of wheel locking is reduced; the retarder is used for providing the braking torque, so that the case that the parking brake is only used and thermal failure occurs can be avoided, the service life of the parking brake is prolonged, and thus the use cost of the vehicle is reduced.

Embodiment IV

Figure 4:
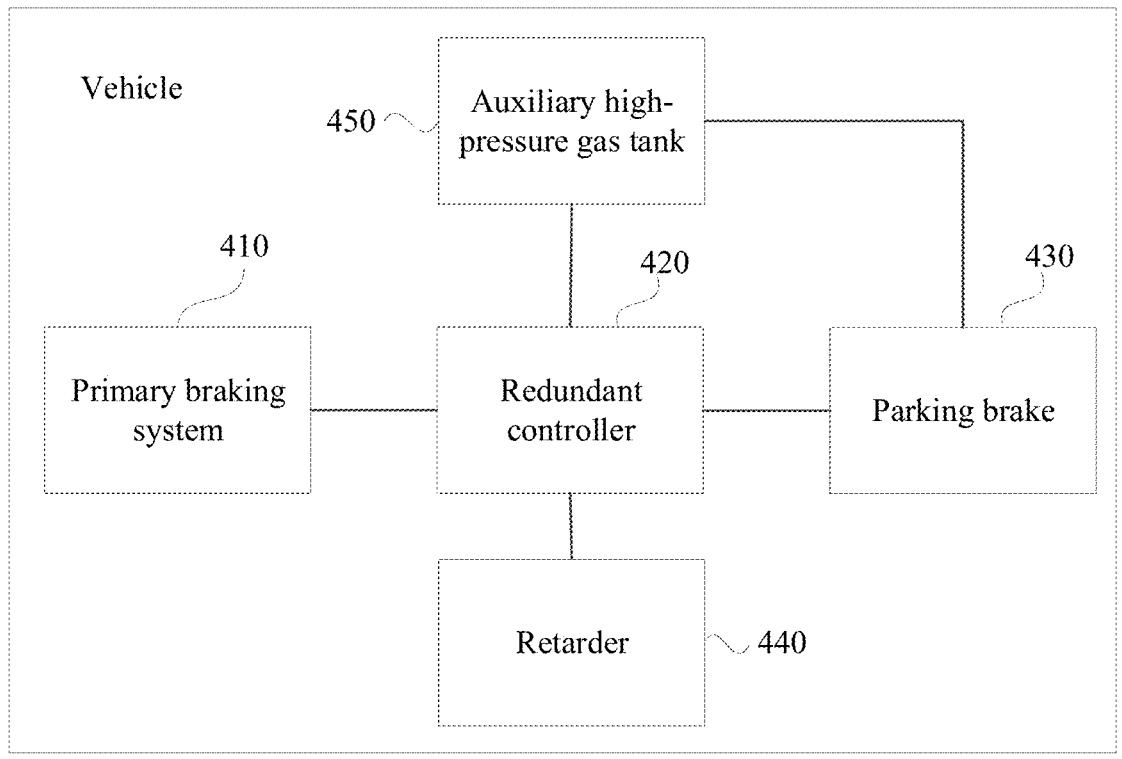
FIG. 4 is a schematic structural diagram of a vehicle according to an embodiment of the present disclosure.

In an embodiment, FIG. 4 is a schematic structural diagram of a vehicle according to an embodiment of the present disclosure. The vehicle in this embodiment comprises: a primary braking system 410, a redundant controller 420, a parking brake 430, a retarder 440, and an auxiliary high-pressure gas tank 450, wherein the redundant controller 420 is respectively connected with the primary braking system 410, the parking brake 430, the retarder 440 and the auxiliary high-pressure gas tank 450, and the auxiliary high-pressure gas tank 450 is connected with the parking brake 430.

In an embodiment, the redundant controller 420 is respectively connected with the primary braking system 410, the parking brake 430, the retarder 440 and the auxiliary high-pressure gas tank 450 through CAN data buses of the redundant braking system; the auxiliary high-pressure gas tank 450 is connected with the parking brake 430 through a gas control passage. In an embodiment, the redundant controller 420 acquires a current air pressure value inside the auxiliary high-pressure gas tank 450 through a pressure sensor mounted on a main passage of the auxiliary high-pressure gas tank 450, and determines whether the current air pressure value reaches a preset air pressure value or not, and when the current air pressure value does not reach the preset air pressure value, the redundant controller 420 controls the air pump to assist in the air charging of the auxiliary high-pressure gas tank 450, so that a process of pressing the working oil of the retarder 440 into the working chamber can be accelerated, and the response time of the retarder 440 can be shortened. Meanwhile, when the primary braking system 410 fails and the current air pressure value of the auxiliary high-pressure gas tank 450 reaches the preset air pressure value, the redundant controller 420 controls the braking torques of the parking brake 430 and the retarder 440 according to the desired deceleration value corresponding to the deceleration signal, such that the parking brake 430 and the retarder 440 apply corresponding braking torques to the transmission shaft and the rear axle, respectively, thereby achieving the purpose of decelerating the vehicle.

Embodiment V

Figure 5:
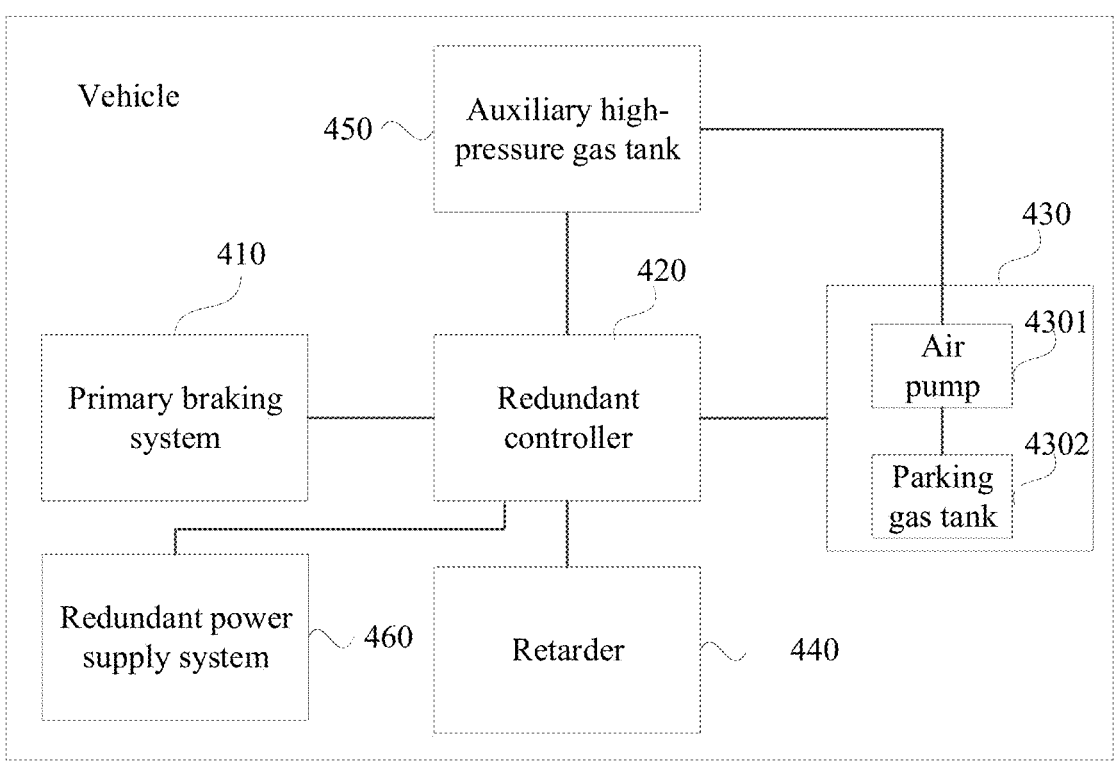
FIG. 5 is a schematic structural diagram of a vehicle according to another embodiment of the present disclosure.

In an embodiment, FIG. 5 is a schematic structural diagram of a vehicle according to another embodiment of the present disclosure. The vehicle of FIG. 5 differs from the vehicle of FIG. 4 in that the parking brake comprises an air pump and a parking gas tank, and the vehicle further comprises a redundant power supply system. In order to avoid unnecessary repetition, the parts of the vehicle in this embodiment that are the same as those in the above embodiment are not repeated herein, and the parts of this embodiment that are different from those in the above embodiment are described below in detail.

As shown in FIG. 5, the vehicle in this embodiment further comprises: a redundant power supply system 460, wherein the redundant power supply system 460 is connected with the redundant controller 420 and is configured for supplying power to the redundant controller 420. In addition, the parking brake 430 comprises an air pump 4301 and a parking gas tank 4302, wherein the air pump 4301 is respectively connected with an auxiliary high-pressure gas tank 450 and a parking gas tank 4304.

In an embodiment, the redundant power supply system 460 is electrically connected with the redundant controller 420 to provide power to the redundant controller 420 through the redundant power supply system 460 so as to ensure proper operation of the redundant controller 420. In an embodiment, when the parking brake 430 receives a braking control instruction sent by the redundant controller 420 or the primary braking system 410, the parking brake 430 may adjust the control of a braking spring of the parking brake according to the braking control instruction, and further control a braking torque of the parking brake 430 itself, and the parking brake 430 may comprise a parking gas tank 4302 so as to control the braking torque of the parking brake 430 through air-charging and air-discharging operations inside the parking gas tank 4302. Of course, the parking brake 430 further comprises an air pump 4302 to control the air pump 4302 to perform air-charging and air-discharging operations on the parking gas tank 4302.

In an embodiment, the retarder 440 is a hydraulic retarder, the hydraulic retarder is connected with the auxiliary high-pressure gas tank 450, and the auxiliary high-pressure gas tank 450 is configured for receiving an instruction from the redundant controller 420, and establishing a working state of the hydraulic retarder based on the instruction. In an embodiment, when the retarder 440 is a hydraulic retarder, the redundant controller 420 sends a braking control instruction to the auxiliary high-pressure gas tank 450, and determines whether the current air pressure value of the auxiliary high-pressure gas tank 450 reaches a preset air pressure value or not, the air pump is controlled to assist in the air charging of the auxiliary high-pressure gas tank 450 if the current air pressure value does not reach the preset air pressure value. The preloaded high-pressure air pressure inside the auxiliary high-pressure gas tank 450 can be configured for accelerating the process of the working oil of the hydraulic retarder entering the working chamber thereof, so that the response time of the hydraulic retarder is shortened.

In an embodiment, the redundant controller 420 is configured for implementing the braking method according to any of the above embodiments. In an embodiment, the braking method according to any of the above embodiments may be implemented by the redundant controller 420 in the vehicle.

Embodiment VI

Figure 6:
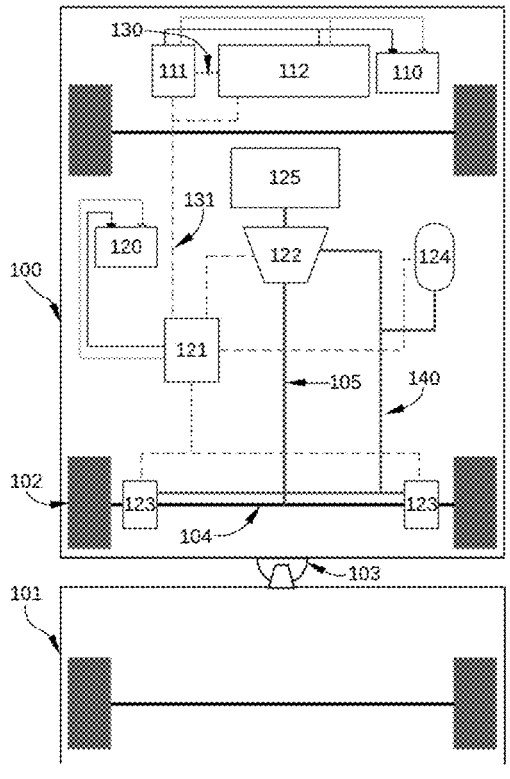
FIG. 6 is a schematic structural diagram of a vehicle according to yet another embodiment of the present disclosure.

In an embodiment, FIG. 6 is a schematic structural diagram of a vehicle according to yet another embodiment of the present disclosure. As shown in FIG. 6, the vehicle in this embodiment comprises: a vehicle body 100, a trailer 101, wheels 102, a vehicle-to-trailer interface 103, axles 104, a vehicle transmission shaft 105, a primary power supply system 110, a primary controller 111, a sensor system 112, a redundant power supply system 120, a redundant controller 121, a hydraulic retarder 122, a parking brake 123, an auxiliary high-pressure gas tank 124, a vehicle engine 125, a primary CAN data bus 130, a CAN data bus 131 of the redundant braking system, and a gas control passage 140.

The parking brake 123 comprises: an air pump and a parking gas tank. The gas control passage 140 is a gas control passage between the auxiliary high-pressure gas tank 124, the hydraulic retarder 122 and the parking gas tank inside the parking brake 123.

It needs to be noted that the hydraulic retarder 122 may also be replaced with an eddy current retarder (electromagnetic retarder). Because the control modes of the two different types of retarders are different, the eddy current retarder does not need to accelerate the response time through the auxiliary high-pressure gas tank 124. Accordingly, when the eddy current retarder is used, the auxiliary high-pressure gas tank 124 and the retarder 122 need not be connected through the gas control passage 140.

Embodiment VII

Figure 7:
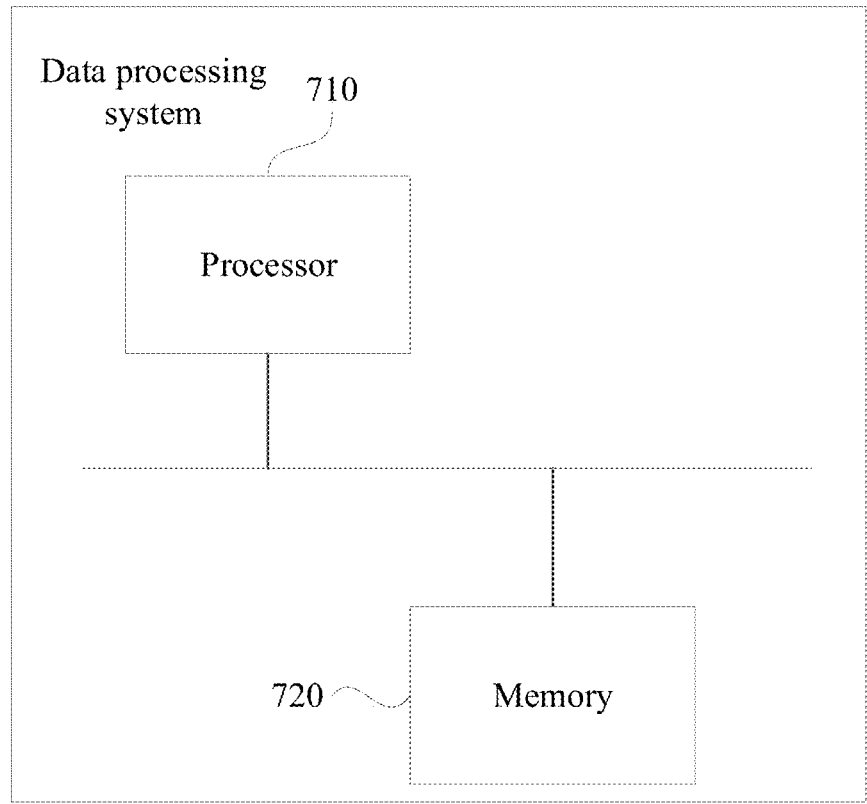
FIG. 7 is a schematic structural diagram of a data processing system according to an embodiment of the present disclosure.

In an embodiment, FIG. 7 is a schematic structural diagram of a data processing system according to an embodiment of the present disclosure. As shown in FIG. 7, the data processing system in this embodiment comprises: a processor 710 and a memory 720, wherein the memory 720 is configured for storing one or more programs; the one or more programs, when executed by the processor 710, cause the processor to implement the braking method according to any of the above embodiments.

In an embodiment, the braking method may be implemented by a separate data processing system, that is, the data processing system establishes a communicative connection with the vehicle, such that the data processing system implements the braking method according to the above embodiments, and controls the execution operations of the respective modules in the vehicle.

In an embodiment, an embodiment of the present disclosure further provides a computer-readable storage medium having a program instruction stored thereon, wherein the program instruction, when executed by a processor, implements the braking method according to any of the above embodiments of the present disclosure.

According to the embodiment of the present disclosure, the redundant braking system can acquire the vehicle operation parameters in real time based on the characteristics of abundant vehicle-mounted sensors and strong data processing capacity of the autonomous vehicle, and timely discovers the failure of the primary braking system by comparing the current deceleration value of the vehicle with the desired deceleration value.

According to the embodiment of the present disclosure, by additional arrangement of the auxiliary high-pressure gas tank, the auxiliary high-pressure gas tank is enabled to keep the working air pressure in advance, and can be configured for quickly establishing a working state of the hydraulic retarder in the redundant braking system when the primary braking system fails, so that the response time of the redundant braking system is shortened, the braking torque is timely supplemented, the coping efficiency of the redundant braking system is improved, and the purpose of shortening the braking distance is finally achieved.

The auxiliary high-pressure gas tank arranged in the embodiment of the present disclosure can also be configured for controlling the parking brake in the redundant braking system, and can realize alternate control of the parking brake through cooperative use with the parking gas tank, so that the control delay of the parking brake caused by long air pressure establishment time is reduced, and the control frequency of the parking brake is improved, and thus the redundant braking system can better control the slip rate of wheels, the occurrence of the vehicle locking condition is avoided, and the vehicle stability during the braking is improved.

According to the embodiment of the present disclosure, the braking mode through the cooperative use of the retarder and the parking brake enables the problem of brake thermal failure caused by braking of the parking brake under the long-distance high-speed braking to be controlled, and thus the reliability of the system is improved.

It should be noted that the above description is only preferred embodiments of the present disclosure and the principles of the employed technologies. It should be understood by those skilled in the art that the present disclosure is not limited to the particular embodiments described herein, and those skilled in the art can make various obvious changes, rearrangements and substitutions without departing from the protection scope of the present disclosure. Therefore, although the present disclosure has been described in some detail by the above embodiments, it is not limited to the above embodiments, and may further include other equivalent embodiments without departing from the spirit of the present disclosure, and the scope of the present disclosure is determined by the scope of the appended claims.

What is claimed is:

1. A braking method for a vehicle, wherein the vehicle comprises a primary braking system, a parking brake, an auxiliary high-pressure gas tank, and a retarder, and the method comprising:

determining whether a current air pressure value of the auxiliary high-pressure gas tank reaches a preset air pressure value;

controlling, in response to the current air pressure value not reaching the preset air pressure value, the auxiliary high-pressure gas tank to carry out air pressure loading; and controlling, in response to failure of the primary braking system and the current air pressure value reaching the preset air pressure value, a first braking torque of the parking brake and a second braking torque of the retarder according to a deceleration signal of the vehicle so as to control the vehicle to brake;

wherein the controlling, according to the desired deceleration value, the first braking torque and the second braking torque comprises:

controlling, according to the desired deceleration value, a parking gas tank of the parking brake and the auxiliary high-pressure gas tank to alternately adjust the first braking torque;

wherein the controlling the first braking torque of the parking brake and the second braking torque of the retarder according to the deceleration signal of the vehicle comprises:

determining, according to the deceleration signal, a desired deceleration value; and controlling, according to the desired deceleration value, the first braking torque and the second braking torque;

wherein the retarder is a hydraulic retarder, and the controlling, according to the desired deceleration value, the first braking torque and the second braking torque comprises:

controlling the auxiliary high-pressure gas tank to establish a working state of the hydraulic retarder so as to control the second braking torque.

2. The method according to claim 1, wherein the primary braking system comprises a primary controller, and the determining whether the current air pressure value of the auxiliary high-pressure gas tank reaches the preset air pressure value specifically comprises:

determining, in response to receiving the deceleration signal from the primary controller, whether the current air pressure value reaches the preset air pressure value.

3. The method according to claim 1, wherein the vehicle further comprises a sensor system, and the method further comprises:

acquiring vehicle operation parameters collected by the sensor system; and determining, according to the deceleration signal and the vehicle operation parameters, whether the primary braking system fails.

4. The method according to claim 3, wherein the determining, according to the deceleration signal and the vehicle operation parameters, whether the primary braking system fails comprises:

determining, according to the deceleration signal, a desired deceleration value;

determining, according to the vehicle operation parameters, the current deceleration value;

determining a difference value between the desired deceleration value and the current deceleration value; and determining, in response to an absolute value of the difference value being greater than a preset difference threshold, that the primary braking system of the vehicle fails.

5. The method according to claim 1, the controlling, according to the desired deceleration value, the first braking torque and the second braking torque comprises:

in response to a sum of the second braking torque and the first braking torque reaching a third braking torque corresponding to the desired deceleration value, and the second braking torque not reaching a maximum braking torque provided by the retarder, increasing the second braking torque;

reducing the first braking torque; and keeping the sum of the second braking torquer and the first braking torque unchanged.

6. The method according to claim 1, wherein the retarder is a hydraulic retarder, and the controlling, according to the desired deceleration value, the first braking torque and the second braking torque comprises:

controlling the auxiliary high-pressure gas tank to establish a working state of the hydraulic retarder so as to adjust the second braking torque;

controlling, according to the desired deceleration value, the auxiliary high-pressure gas tank to adjust the first braking torque; and in response to a sum of the braking torque of the hydraulic retarder and the first braking torque of the parking brake reaching a third braking torque corresponding to the desired deceleration value, and the second braking torque not reaching a maximum braking torque provided by the hydraulic retarder:

increasing the second braking torque;

reducing the first braking torque; and keeping the sum of the second braking torque and the first braking torque unchanged.

7. The method according to claim 1, wherein controlling the parking gas tank of the parking brake and the auxiliary high-pressure gas tank to alternately adjust the first braking torque comprising:

alternately air-charging and air-discharging the auxiliary high-pressure gas tank and the parking gas tank.

8. The method according to claim 1, wherein controlling the parking gas tank of the parking brake and the auxiliary high-pressure gas tank to alternately adjust the first braking torque comprising:

using an electromagnetic switching valve for switching a connection between a parking brake control gas circuit and the auxiliary high-pressure gas tank or the parking gas tank by alternately air-charging and air-discharging the auxiliary high-pressure gas tank and the parking gas tank.

9. The method according to claim 1, wherein the vehicle further comprises a redundant controller which is respectively connected with the primary braking system, the parking brake, the retarder and the auxiliary high-pressure gas tank.

10. The method according to claim 9, wherein the auxiliary high-pressure gas tank is configured for receiving an instruction from the redundant controller and establishing a working state of the hydraulic retarder based on the instruction.

11. A vehicle, comprising:
a primary braking system, a redundant controller, a parking brake, a retarder and an auxiliary high-pressure gas tank,
wherein the redundant controller is respectively connected with the primary braking system, the parking brake, the retarder and the auxiliary high-pressure gas tank, and the auxiliary high-pressure gas tank is connected with the parking brake;
wherein the redundant controller is configured for:
controlling, in response to a current air pressure value not reaching a preset air pressure value, the auxiliary high-pressure gas tank to carry out air pressure loading; and
controlling, in response to failure of the primary braking system and the current air pressure value reaching the preset air pressure value, a parking gas tank of the parking brake and the auxiliary high-pressure gas tank to alternately adjust a first braking torque of the parking brake according to a desired deceleration value;
wherein the retarder is a hydraulic retarder, the hydraulic retarder is connected with the auxiliary high-pressure gas tank, and the auxiliary high-pressure gas tank is configured for receiving an instruction from the redundant controller and establishing a working state of the hydraulic retarder based on the instruction.

12. The vehicle according to claim 11, wherein the parking brake comprises an air pump and a parking gas tank, the air pump being respectively connected with the auxiliary high-pressure gas tank and the parking gas tank.

13. The vehicle according to claim 11, further comprising a redundant power supply system connected with the redundant controller for supplying power to the redundant controller.

14. The vehicle according to claim 11, wherein the primary braking system comprises a primary controller, and the redundant controller is further configured for implementing the braking method comprising:
determining, in response to receiving the deceleration signal from the primary controller, whether the current air pressure value reaches the preset air pressure value.

15. The vehicle according to claim 11, further comprising a sensor system, wherein the redundant controller is further configured for implementing the braking method comprising:
acquiring vehicle operation parameters collected by the sensor system; and

determining, according to the deceleration signal and the vehicle operation parameters, whether the primary braking system fails.

16. A non-transitory computer-readable storage medium, having a computer program stored thereon, wherein the program, when executed by a processor, causes the processor to implement a braking method for a vehicle; wherein the vehicle comprises a primary braking system, a parking brake, an auxiliary high-pressure gas tank, and a retarder, and the method comprises:
determining whether a current air pressure value of the auxiliary high-pressure gas tank reaches a preset air pressure value;
controlling, in response to the current air pressure value not reaching the preset air pressure value, the auxiliary high-pressure gas tank to carry out air pressure loading; and
controlling, in response to failure of the primary braking system and the current air pressure value reaching the preset air pressure value, a first braking torque of the parking brake and a second braking torque of the retarder according to a deceleration signal of the vehicle so as to control the vehicle to brake;
wherein the controlling, according to the desired deceleration value, the first braking torque and the second braking torque comprises:
controlling, according to the desired deceleration value, a parking gas tank of the parking brake and the auxiliary high-pressure gas tank to alternately adjust the first braking torque;
wherein the controlling the first braking torque of the parking brake and the second braking torque of the retarder according to the deceleration signal of the vehicle comprises:
determining, according to the deceleration signal, a desired deceleration value; and
controlling, according to the desired deceleration value, the first braking torque and the second braking torque;
wherein the retarder is a hydraulic retarder, and the controlling, according to the desired deceleration value, the first braking torque and the second braking torque comprises:
controlling the auxiliary high-pressure gas tank to establish a working state of the hydraulic retarder so as to control the second braking torque.

17. The medium according to claim 16, wherein the primary braking system comprises a primary controller, and the program, when executed by the processor, causes the processor further to implement the braking method comprising:
determining, in response to receiving the deceleration signal from the primary controller, whether the current air pressure value reaches the preset air pressure value.

18. The medium according to claim 16, wherein the vehicle further comprises a sensor system, and the program, when executed by the processor, causes the processor further to implement the braking method comprising:
acquiring vehicle operation parameters collected by the sensor system; and
determining, according to the deceleration signal and the vehicle operation parameters, whether the primary braking system fails.

19. The medium according to claim 18, wherein the retarder is a hydraulic retarder, and the program, when executed by the processor, causes the processor further to implement the braking method comprising:

controlling the auxiliary high-pressure gas tank to establish a working state of the hydraulic retarder so as to adjust the second braking torque;

controlling, according to the desired deceleration value, the auxiliary high-pressure gas tank to adjust the first braking torque; and in response to a sum of the braking torque of the hydraulic retarder and the first braking torque of the parking brake reaching a third braking torque corresponding to the desired deceleration value, and the second braking torque not reaching a maximum braking torque provided by the hydraulic retarder:

increasing the second braking torque;

reducing the first braking torque; and keeping the sum of the second braking torque and the first braking torque unchanged.

* * * * *